Feb. 20, 1968 B. S. WILDI 3,369,941

THERMOELECTRIC DEVICE

Original Filed June 7, 1960 2 Sheets-Sheet 1

INVENTOR
BERNARD S. WILDI
BY Lloyd B. Stevens, Jr.
ATTORNEY

THERMOELECTRIC DEVICE

Original Filed June 7, 1960 2 Sheets-Sheet 2

INVENTOR
BERNARD S. WILDI
BY Lloyd B. Stevens, Jr.
ATTORNEY

United States Patent Office 3,369,941

Patented Feb. 20, 1968

3,369,941

THERMOELECTRIC DEVICE

Bernard S. Wildi, Dayton, Ohio, assignor to Monsanto Company, St. Louis, Mo., a corporation of Delaware Original application June 7, 1960, Ser. No. 34,430, now Patent No. 3,259,628, dated July 5, 1966. Divided and this application Apr. 19, 1965, Ser. No. 458,504
9 Claims. (Cl. 136—236)

ABSTRACT OF THE DISCLOSURE

Thermoelectric devices for cooling or generating direct current power comprising a thermoelectric component of the non-sublimable residue from the alkali-free material recovered from alkali fusion of a compound of the formula

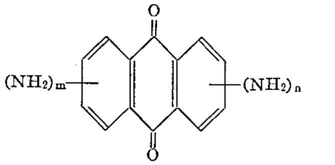

e.g. indanthrone, where $m$ is 0, 1 or 2, $n$ is 1 or 2, and electrical connections to said component.

The subject application is a division of application Ser. No. 34,430, filed June 7, 1960, now U.S. Patent No. 3,259,628.

The invention relates to new compositions, articles or bodies made therefrom and thermoelectric devices. These bodies can suitably be in the form of discs, wafers, bars, rods, rectangular parallelepipeds, round, or most any geometric shape.

It is known that indanthrone has a resistivity ($\rho$) of $7\times10^{14}$ ohm-cm. at 15° C. (H. Inokuchi, Japan 28, 28 (1952)). This resistivity places indanthrone in the insulator range since the resistivity is higher than the maximum for semiconductors of about $10^8$ ohm-cm. It has now been found that the non-sublimable residue from a commercial indanthrone sample has a resistivity of $1.2\times10^3$ ohm-cm. at 100° C. This compares with the resistivity of $2.0\times10^{11}$ ohm-cm. at 103° C. for the material which did sublime e.e. indanthrone. This very extreme and marked difference in resistivity of sublimed material versus non-sublimable residue is very surprising.

It is an object of this invention to provide new and useful compositions of matter.

It is another object of this invention to provide new components useful in barrier layer devices.

It is another object of this invention to provide new and useful thermoelectric devices.

It is another object of this invention to provide new and useful thermoelectric devices for generating direct current power.

It is another object of this invention to provide new and useful devices for cooling thermoelectrically.

These and other objects of the invention will become apparent as the detailed description of the invention proceeds.

Indanthrone which is commercially available can be made in various ways [Synthetic Dyes, Vol. II, pages 931–933 (1952) Venkataraman]. One method of preparing indanthrone is by akali fusion of $\beta$-aminoanthraquinone [Scholl et al., Monatsch. 32, 1035 (1911); Ber. 36, 3410, 3427, 3710 (1903); 40, 320, 326, 390, 395, 924, 933 (1907); Bohn, ibid. 36, 1258 (1903); 43, 999 (1910); Kausler, ibid. 36, 930, 1721 (1903); see also Lulek, J. Soc. Dyers Colourists 43, 370 (1927)]. This invention involves not only the alkali fusion of $\beta$-aminoanthraquinone but the alkali fusion of compounds such as the following or mixtures thereof:

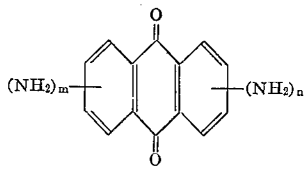

wherein $m$ is an integer from 0 to 2 inclusive and $n$ is an integer from 1 to 2. After the alkali fusion treatment the alkali is removed from the crude product by water washing the product. This crude washed product is defined as alkali-free being substantially so. The alkali-free product is then subjected to sublimation treatment under high vacuum to remove material that will sublime and give a non-sublimable residue which is the desired organic semi-conductor material.

Pellets or articles or components can be formed from the powdered non-sublimable residue product without the use of binders using a sufficient pressure to fuse the powdered material into a pellet of the desired strength. If desired, a binder material can be used to facilitate pelleting. The pelleting can be carried out without application of heat although hot-pressing can be desirable to form pellets of the desired strength.

The type and/or degree of conductivity and the thermoelectric properties of the powdered or pelleted semiconductor material of the invention can be changed by treating the material under high vacuum or in the presence of an inert atmosphere at temperatures in the range of about 180–700° C., preferably 300–600° C. The time of heating varies with the temperature and the properties of the product desired, and may vary from an hour or less to a number of days.

The invention will be more clearly understood from the following detailed description of specific examples thereof read in conjunction with the accompanying drawing wherein.

*Example 1*

Figure 1:
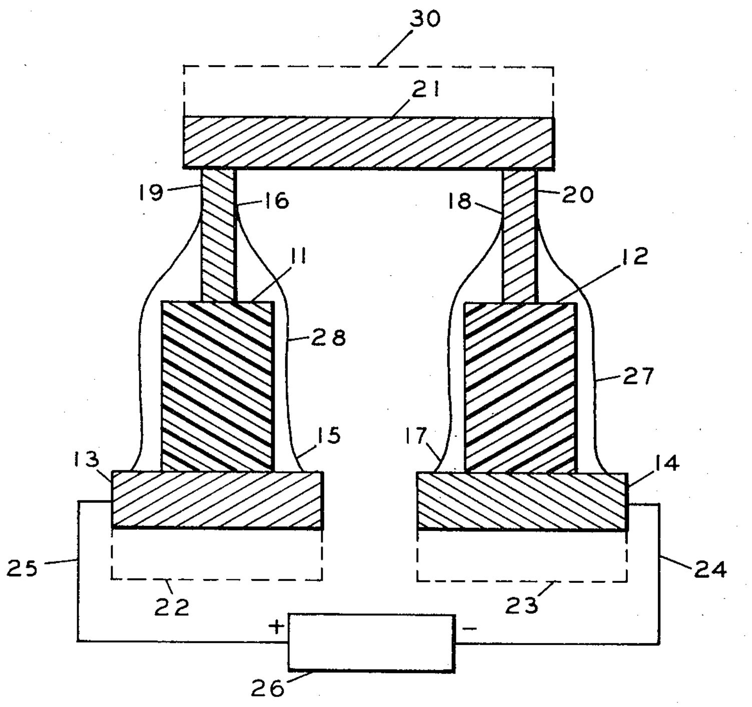
FIGURE 1 is an elevational view partly in section of one embodiment of the invention.

A sample of 20 grams of commercial indanthrone was subjected to vacuum sublimation at 400° C./0.15 mm. of Hg. After the first day the sublimation temperature was increased to 430° C./0.1–0.08 mm. of Hg and the sublimation was continued for a total of 15 days. Some orange-yellow material sublimed out. The residue product remaining was 3.86 grams of a black fluffy material. An elemental analysis of this residue product yielded the following results:

Calc'd for $(C_{64}H_{22}N_5O_5)_x$; percent: C, 81.7; H, 2.3; N, 7.4. Found: C, 81.5; H, 2.3; N, 7.4.

*Example 2*

This example describes the determination of the electrical properties of the residue product of Example 1. This material was tested in powdered form as follows: The test cell for the electrical measurement is a hollow quartz cylinder placed upright on a platinum plate which seals the bottom opening of the cylinder. The internal diameter of the quartz cylinder is ¾″. The powdered sample to be tested is added to the quartz cylinder to a depth of 1–2 millimeters. A platinum slug is inserted to the top of the quartz cylinder and a pressure of 900 g./sq. cm. is applied through this platinum slug to the powdered sample. The sample is heated by conduction through the platinum plate to a temperature of about 280° C. under a vacuum of about $10^{-3}$ mm. of Hg at least overnight. The next day the sample is subjected to a series of treatments involving evacuation under high vacuum purging with nitrogen, evacuation under high vacuum and finally to a nitrogen atmosphere of 5″ of Hg absolute pressure for the electrical testing. During the electrical testing the pressure of 900 g./sq. cm. is maintained on the powdered sample as described above. As indicated above, the heating of the samples is accomplished by conduction through the platinum plate upon which the quartz cylinder rests.

The powdered sample was tested for resistivity at various temperatures from above room temperature ranging up to as high as 300° C. or higher. The sample was tested in a number of cycles of heating and cooling measuring the resistivity on the cooling cycle from the high temperature down to near room temperature. On the last two cycles the sample seemed to be fairly stable in resistivity and the resistivity at 100° C. was $1.2\times10^3$ ohm-cm, and at 77° C. was $1.5\times10^3$ ohm-cm. This is compared with a resistivity at 103° C. of $2.0\times10^{11}$ ohm-cm. for the sublimed indanthrone material recovered from Example 1 and a literature value for indanthrone of $7\times10^{14}$ ohm-cm. at 15° C.

*Example 3*

From a powdered sampel of the residue product of Example 1, a ½″ by about 1 mm. pellet was formed by cold pressing in a dye using a force of about 20,000 pounds. Prior to the pressing operation the material was evacuated for about 10 minutes at 0.1 mm. of Hg absolute pressure.

The thermoelectric testing of the pelleted material was carried out in the following fashion: The pellet to be tested was placed on a gold plated copper plate which served as a cold (about 23° C.) electrode of the thermoelectric generator. The hot electrode for the generator was a soldering iron having a gold-plated tip which was mounted in a jig and could be raised or lowered by a screw arrangement. Three measurements were taken at different points on the sample and averaged for the thermoelectric power reported. During the measurements the soldering iron was pressed against the upper surface of the sample with sufficient pressure being applied to give good ohmic contact both for the soldering iron and the copper plate with the sample. The series electrical circuit was completed from the gold plated copper plate through a galvanometer, the soldering iron, the sample and back to the copper plate. In the test the hot probe was heated to approximately 100° above the temperature of the cold plate before being applied to the pellet being tested. The actual hot probe and cold plate temperatures were measured by thermocouple. For each reading the apparatus was allowed to come to equilibrium and the highest voltage generated was noted. Although the pyrolyzed pellets have very good thermoinsulating powers, if the hot probe is maintained in contact with the sample over a long period of time the cold copper plate tends to approach the temperature of the hot probe due to heat of conduction through the sample. This is the reason for taking the highest voltage noted on the galvanometer as the reading, because this is in fact indicative of the thermoelectric properties of the sample.

From the thermoelectric test of this sample a thermoelectric power (TEP) of −16 microvolts/° C. was determined. The negative sign indicates that the sample has N-type conductivity.

FIGURE 1 broadly embodies a thermoelectric device which can be either a thermoelectric generator or a thermoelectric cooling device depending on the designation of certain of the components. For the thermoelectric generating device a body 11 in the form of an N-type wafer or disc of the material of the invention is used, and body 12 is a P-type wafer of the material of the invention or alternatively a P-type wafer of pyrolyzed pyromellitonitrile/methanol reaction product described in detail in copending application Ser. No. 11,897, filed Feb. 29, 1960, now Patent No. 3,157,687. Electrode leads from the tops of the discs 11 and 12 are numbered 19 and 20, and these electrodes can be copper, aluminum or other suitable conductors. Ohmic contact can be made between discs 11 and 12 and electrodes 19 and 20, respectively, by coating the upper surface of the discs with silver or other noble metal and soldering the electrodes thereto, with e.g. a lead-tin eutectic alloy having some cadmium therein. The coating of silver, for example, can be applied to the top of the discs by evaporation of the silver on to the tops or alternatively with silver paint, which is commercially available. The other ends of the electrodes 19 and 20 are then connected by soldering or other suitable mechanical means to cold junction body 21, which is a copper or aluminum rectangular plate. The hot junctions of the device consist of copper or aluminum bodies 13 and 14, which are suitably in the form of rectangular plates and are electrically connected to discs 77 and 12 in a similar manner as were electrodes 19 and 20.

Discs 11 and 12 can be enclosed in glass shells 27 and 28, which are sealed to the hot junction bodies 13 and 14 which are rectangular copper or aluminum plates by metal to glass seals 15 and 17. These metal seals for use in sealing metal to glass, i.e. making metal to glass junction seals, are well known and commercially available. Similar metal seals 16 and 18 are used to seal the glass envelope to electrodes 19 and 20. Glass seals such as have been proposed can be used where it is desirable to encapsulate the discs for one reason or another. Thus the discs 11 and 12 or one of them can be surrounded by any desired atmosphere, inert or otherwise, or by high vacuum, if desired.

If the device of FIGURE 1 is to be a thermoelectric generating device, elements 22 and 23 are some sort of heating source, such as a heating jacket, gas burners, etc. It is desirable although not mandatory that the cold junction 21 have the heat removed therefrom by a cooling jacket 30, which is attached to plate 21. Cooling fluid, for example, water is circulated through jacket 30 to remove the heat transmitted by the hot junctions to plate 21. Suitably also, plate 21 is cooled by forced drafts or air as by a fan blowing over the surface of plate 21. With such an arrangement as this, i.e., heated plates 13 and 14 and cooled plate 21, a thermoelectric current will be generated in discs 11 and 12, and if 26 is a load such as a radio receiver, a storage battery to be charged, a microswitch or other type of switch to be operated, or other electrical device, power will be provided to operate the electrical device. The positive and negative terminals of the device are indicated in FIGURE 1 as opposite ends of load 26. Voltage generated can be increased by connecting a number of such N-type and P-type bodies in series. For increased current flow, a number of the bodies are connected in parallel.

If instead of a load 26, a battery 26 or other direct current source of electricity is connected with positive and negative terminals as indicated in FIGURE 1, a thermoelectric cooling system results. In this system the cold junction will be plate 21 and the hot junctions plates 13 and 14. In a refrigerating apparatus, for example, or for that matter in other cooling devices, it is desirable for maximum heat removal from the hot junctions to add cooling fins to plates 13 and 14. Also, suitable heat transfer fins are added to plate 21 to absorb heat and transmit it to plate 21. For use in refrigeration cold junction 21 would, of course, be positioned within the compartment or area to be cooled, whereas the hot junctions would be positioned outside of the area being cooled. A number of the devices of FIGURE 1 could be electrically connected in parallel or in series as would be most appropriate to increase the cooling surface and capacity.

Figure 2:
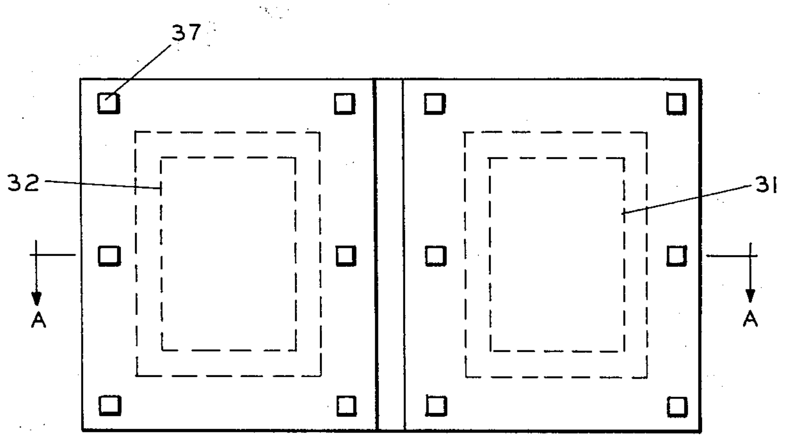
FIGURE 2 is a bottom view of another embodiment of the invention.
Figure 3:
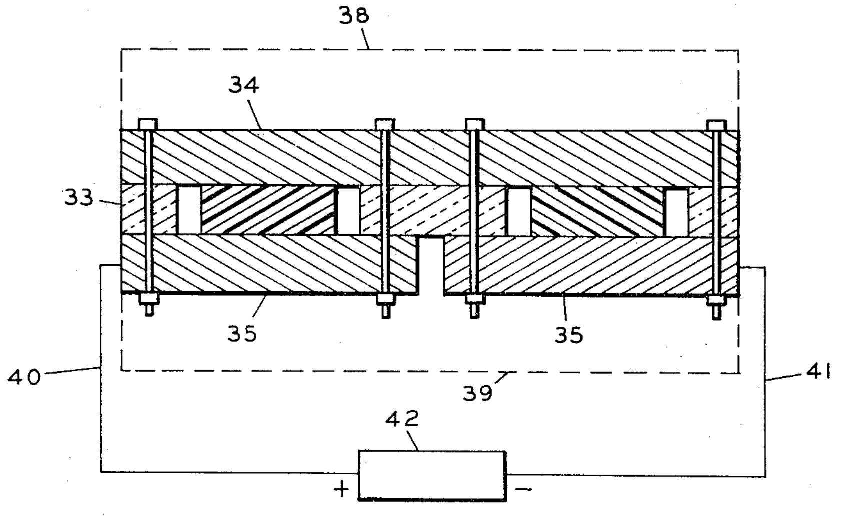
FIGURE 3 is an elevational view partially in section of the same embodiment as FIGURE 2.

FIGURES 2 and 3 show another embodiment of the invention. Bodies 31 and 32 suitably in the form of rectangular plates are P-type and N-type material of the invention, respectively; however, alternatively, either of bodies 31 or 32 can be pyrolyzed pyromellitonitrile/methanol reaction products described in detail in copending application Ser. No. 11,897, filed Feb. 29, 1960. Body 34 suitably a copper or aluminum rectangular plate serves as the cold junction for the device, being bonded to plates 31 and 32 in a similar manner to that described in FIGURE 1. The hot junction bodies 35 and 36 suitable copper or aluminum plates are in a like fashion electrically connected to discs 31 and 32 to form ohmic junctions therewith. Gasket 33 is normally preferably made of an inorganic material such as glass, mica, or other materials which will withstand high temperatures, if the thermoelectric device is to be subjected to high temperature. If the device is not to be subjected to high temperatures, rubber or other similar gaskets can be used. Gasket 33 serves as an insulating separator between plates 34 and 35 and 36, and also serves to enclose on the sides thermoelectric discs 31 and 32. Thus with the metal plates 34, 35, and 36, and the gasket 33, plates 31 and 32 are encapsulated in separate compartments surrounded on the sides by vapor spaces. To prevent electrical short-circuiting of the device bolts and nuts 37 must be insulated from metal plates 34, 35 and 36 by electrical insulating washers and sleeves made of conventional materials such as rubber or inorganic materials described above, if the device is to be used at high temperatures.

As in FIGURE 1, if the device is a thermoelectric generator, it is necessary to have a heating means 39 which can be the same as described in FIGURE 1 for heating hot junctions which are plates 35 and 36, and it is desirable for maximum efficiency although not mandatory that cold junction plate 34 be cooled by conventional means 38 such as are described with respect to FIGURE 1. Leads 40 and 41 connect electrically hot junction plates 35 and 36 with a load 42, which can suitably be the same type of load as employed in the thermoelectric generator of FIGURE 1.

If the device of FIGURES 2 and 3 is used as a thermoelectric cooling device, it is desirable to attach fins to hot junctions 35 and 36. It is also desirable to employ a blower or other cooling device 39 for the purpose of aiding the removal of heat from the hot junctions. Likewise it is desirable to employ cooling fins attached to cold junction 34 for gathering heat from the enclosure which is being cooled and conducting it to the cold junction. A DC voltage source 42 such as a battery is connected in the circuit as indicated by the plus and minus terminals on FIGURE 3 to serve as the source of power to operate the cooling device.

As in the case of the device of FIGURE 1 whether used for electrical power generation or cooling, a number of the devices of FIGURES 2 and 3 can suitably be electrically connected in parallel or series.

If the thermoelectric discs are not enclosed in housings such as in FIGURE 1 and FIGURES 2 and 3, it will be desirable in some cases to encapsulate the discs except at the electrode connections, for example, by covering the discs with a protective film of silicone varnish, glass, plastic resin, etc.

In the devices of FIGURES 1–3, either the N-type bodies or the P-type body of material of the invention can be replaced by another N-type or P-type body, e.g. N-type bismuth telluride or P-type bismuth telluride can be used. Other N-type or P-type thermoelectric bodies either organic or inorganic can be used in conjunction with a P-type or an N-type body of material of the invention.

Although the invention has been described in terms of specified apparatus which is set forth in considerable detail, it should be understood that this is by way of illustration only and that the invention is not necessarily limited thereto, since alternative embodiments and operating techniques will become apparent to those skilled in the art in view of the disclosure. For example, in a similar manner to the treatment with bromine of $\beta$-aminoanthraquinone to form 1-amino-2-bromoanthraquinone and condensation to indanthrone [Synthetic Dyes, Vol. II, pp. 932–933 (1952), Venkataraman], so also can the polyamino anthraquinones be treated; and, the non-sublimable residue from this so prepared indanthrone and the similarly treated polyamino bromoanthraquinones will to a degree have similar semiconducting and thermoelectric properties as the non-sublimable residue of Example 1. Accordingly, modifications are contemplated which can be made without departing from the spirit of the described invention.

What is claimed is:

1. In a thermoelectric device for cooling or for generating direct current power, the improvement comprising a body of a non-sublimable composition having semiconductor properties from sublimation of alkali-free material recovered from alkali fusion of a compound of the formula

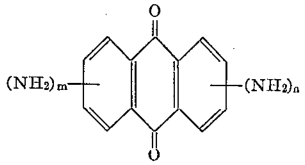

wherein $m$ is an integer from 0 to 2 and $n$ is an integer from 1 to 2, said composition made by heating said alkali-free material under high vacuum at a temperature in the range of about 180–700° C. for a time in the range of less than an hour to a number of days sufficient to make said composition, as a thermoelectric component in said device, and electrical connections to said body.

2. A thermoelectric device comprising an N-type body and a P-type body at least one of which is a body of a non-sublimable composition having semi-conductor properties from sublimation of alkali-free material recovered from alkali fusion of a compound of the formula

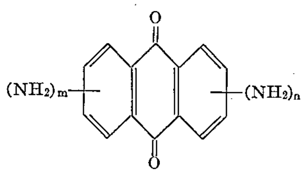

wherein $m$ is an integer from 0 to 2 and $n$ is an integer from 1 to 2, said composition made by heating said alkali-free material under high vacuum at a temperature in the range of about 180–700° C. for a time in the range of less than an hour to a number of days sufficient to make said composition, electrical connections joining said bodies, and other electrical connections to said bodies.

3. The device of claim 2 wherein the body is made of a non-sublimable composition having semiconductor properties from sublimation of indanthrone, said composition made by heating indanthrone under high vacuum at a temperature in the range of about 180–700° C. for a time in the range of less than an hour to a number of days sufficient to make said composition.

4. A thermoelectric cooling device comprising an N-type body and a P-type body at least one of which is a body of a non-sublimable composition having semiconductor properties from sublimation of alkali-free material recovered from alkali fusion of a compound of the formula

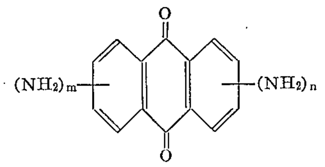

wherein $m$ is an integer from 0 to 2 and $n$ is an integer from 1 to 2, said composition made by heating said alkali-free material under high vacuum at a temperature in the range of about 180–700° C. for a time in the range of less than an hour to a number of days sufficient to make said composition, electrical connections joining said bodies, and other electrical connections for joining said bodies through a direct current source with the positive terminal of said source to be connected to said N-type body and the negative terminal of said source to be connected to said P-type body.

5. The device of claim 4, wherein a metal body for heat transfer electrically joins said N- and P-type bodies, and other metal bodies for heat transfer are to be connected in series electrically between said N- and P-type bodies and said direct current source.

6. A thermoelectric generating device comprising an N-type body and a P-type body at least one of which is a body of a non-sublimable composition having semiconductor properties from sublimation of alkali-free material recovered from alkali fusion of a compound of the formula

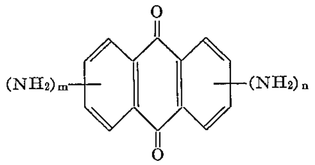

wherein $m$ is an integer from 0 to 2 and $n$ is an integer from 1 to 2, said composition made by heating said alkali-free material under high vacuum at a temperature in the range of about 180–700° C. for a time in the range of less than an hour to a number of days sufficient to make said composition, electrical connections joining said bodies, other electrical connections for joining said bodies through an electrical load, and means for associating a heating source with a pair of the portions of said bodies.

7. The device of claim 6, wherein said heating source is to be associated with a pair of connected portions of said bodies to be connected with said load.

8. The device of claim 7, wherein means is provided for associating a cooling source with the pair of portions of said bodies connected directly together electrically.

9. The device of claim 7, wherein a metal body for heat transfer directly joins electrically the N- and P-type bodies, and metal bodies for heat transfer are provided to be connected in series electrically between said N- and P-type bodies and said load.

No references cited.

ALLEN B. CURTIS, *Primary Examiner.*